(12) United States Patent
Chen

(10) Patent No.: US 9,813,940 B2
(45) Date of Patent: *Nov. 7, 2017

(54) PACKET RADIO COMMUNICATIONS SYSTEM

(71) Applicant: 3G Licensing S.A., Luxembourg (LU)

(72) Inventor: Xiaobao Chen, Swindon (GB)

(73) Assignee: 3G Licensing S.A., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 15/368,417

(22) Filed: Dec. 2, 2016

(65) Prior Publication Data

US 2017/0086091 A1 Mar. 23, 2017

Related U.S. Application Data

(63) Continuation of application No. 14/790,806, filed on Jul. 2, 2015, now abandoned, which is a continuation (Continued)

(30) Foreign Application Priority Data

Mar. 24, 2005 (GB) .................................. 0506094.2

(51) Int. Cl.
*H04W 4/00* (2009.01)
*H04W 28/02* (2009.01)
(Continued)

(52) U.S. Cl.
CPC ....... *H04W 28/0268* (2013.01); *H04W 16/14* (2013.01); *H04W 28/16* (2013.01);
(Continued)

(58) Field of Classification Search
CPC . H04W 72/1215; H04W 16/14; H04W 28/16; H04W 72/0406; H04W 28/06; H04W 88/12; H04W 88/16
See application file for complete search history.

(56) References Cited

U.S. PATENT DOCUMENTS 6,937,566 B1 * 8/2005 Forslow ................ H04L 1/0017
370/231
7,688,859 B2 * 3/2010 Chen ...................... H04L 47/10
370/469

(Continued)

*Primary Examiner* — Brian O'Connor
(74) *Attorney, Agent, or Firm* — Workman Nydegger

(57) ABSTRACT

A packet radio communications system communicates internet packets to and/or from mobile user equipment. The system comprises a core network comprising a plurality of packet data networks, each including network communications elements operable to communicate internet packets using an internet protocol transport plane, and a common gateway support node. The gateway support node is operable to route the internet packets via communications bearers established through the packet data networks using the network communications elements. The system includes a plurality of radio access networks connected by the internet protocol transport plane to the core network components of the packet data networks for communicating the internet protocol packets to and/or from the mobile user equipment. Each of the radio access networks is operable to provide radio access bearers for communicating the internet packets to and/or from the mobile user equipment.

9 Claims, 8 Drawing Sheets

Related U.S. Application Data of application No. 14/049,102, filed on Oct. 8, 2013, now abandoned, which is a continuation of application No. 11/886,985, filed as application No. PCT/GB2006/001040 on Mar. 22, 2006, now Pat. No. 8,570,936.

(51) Int. Cl.

| | | |
|---|---|---|
| *H04W 72/04* | (2009.01) | |
| *H04W 28/16* | (2009.01) | |
| *H04W 16/14* | (2009.01) | |
| *H04W 72/12* | (2009.01) | |
| *H04W 28/06* | (2009.01) | |
| *H04W 88/12* | (2009.01) | |
| *H04W 88/16* | (2009.01) | |
| *H04W 92/02* | (2009.01) | |
| *H04W 88/06* | (2009.01) | |

(52) U.S. Cl.
CPC ... *H04W 72/0406* (2013.01); *H04W 72/1215* (2013.01); *H04W 28/06* (2013.01); *H04W 88/06* (2013.01); *H04W 88/12* (2013.01); *H04W 88/16* (2013.01); *H04W 92/02* (2013.01)

(56) References Cited

U.S. PATENT DOCUMENTS

| | | | |
|---|---|---|---|
| 8,289,937 B2* | 10/2012 | Verma | H04L 12/4633 370/338 |
| 8,289,957 B2* | 10/2012 | Chen | H04L 45/00 370/310 |
| 8,300,575 B2* | 10/2012 | Willars | H04L 47/10 370/328 |
| 8,570,936 B2* | 10/2013 | Chen | H04W 92/02 370/328 |
| 8,611,296 B2* | 12/2013 | Chen | H04W 28/16 370/329 |
| 2003/0152048 A1* | 8/2003 | Soininen | H04W 76/026 370/328 |

\* cited by examiner

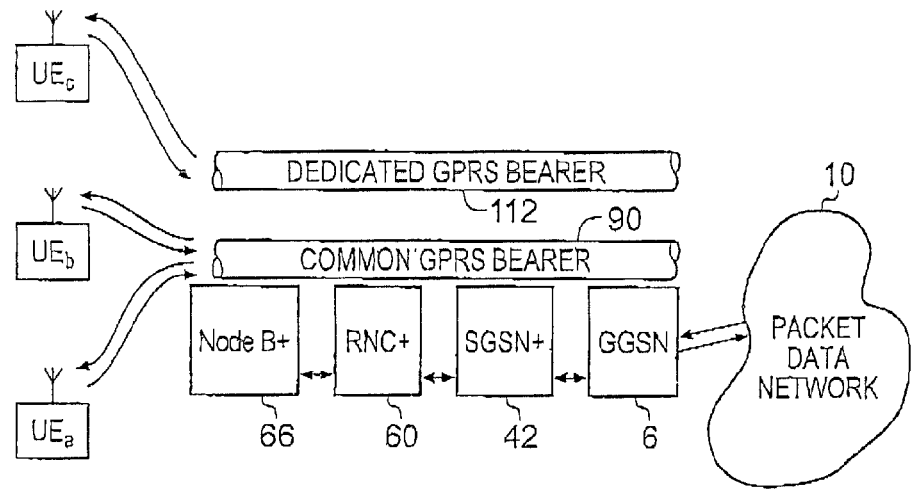
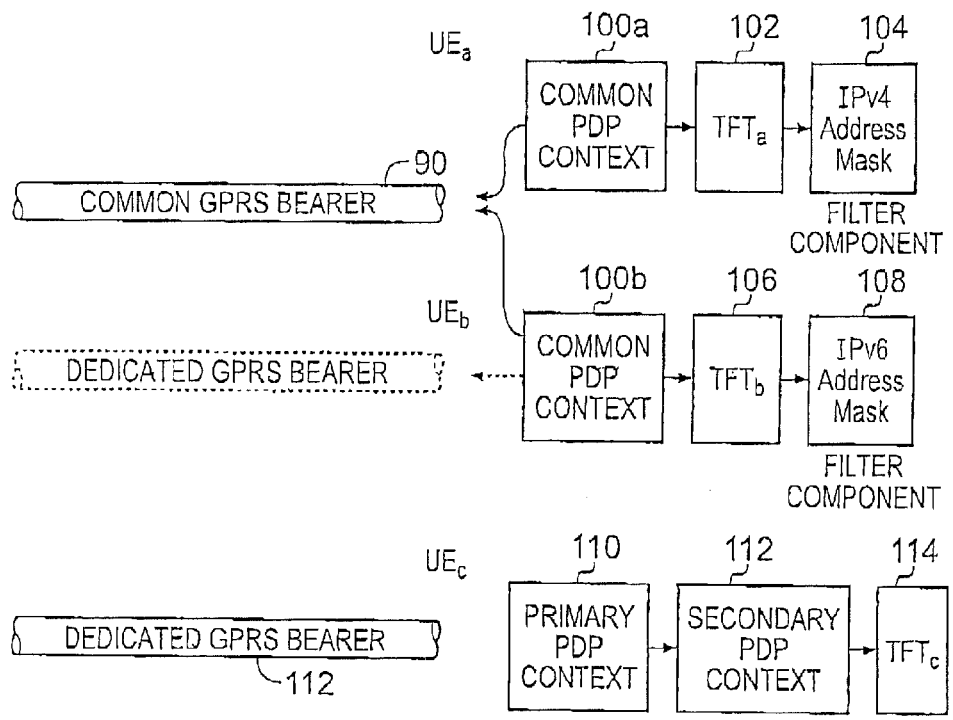
Fig. 6: TFT for Common PDP Context

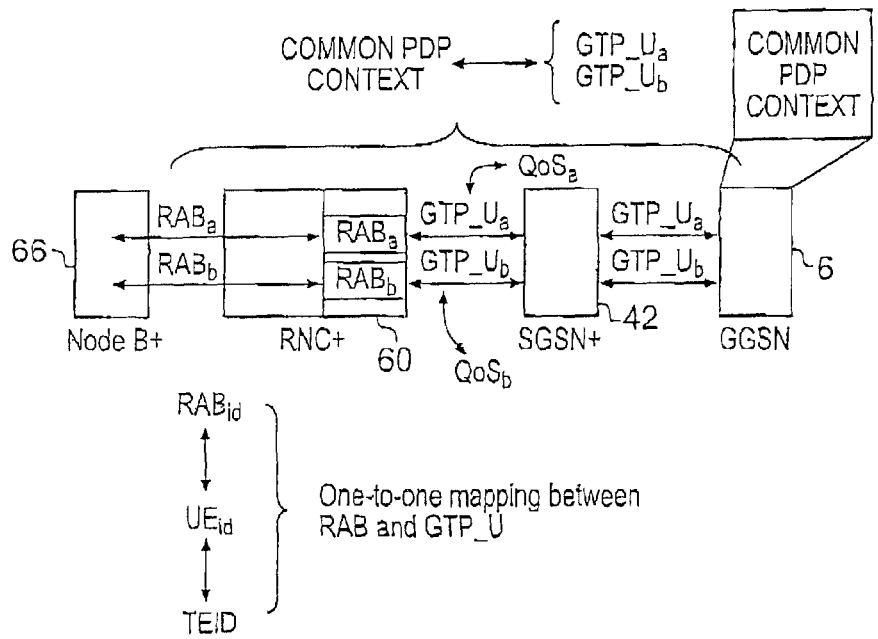
Fig. 7: Common PDP Context Different GPRS Bearer
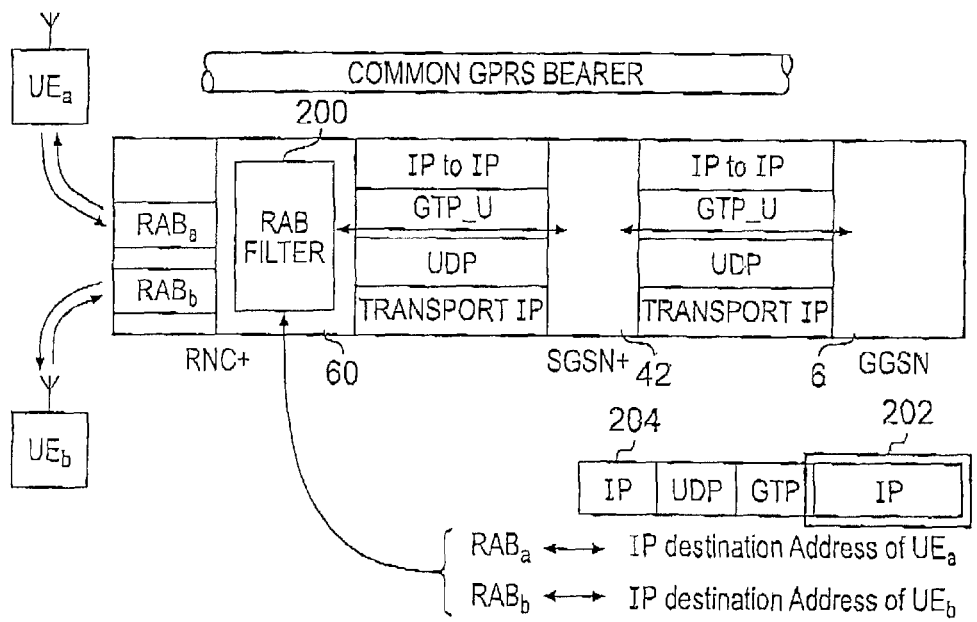
Fig. 8: Common PDP Context Shared GTP_U

PACKET RADIO COMMUNICATIONS SYSTEM

RELATED APPLICATION(S)

The present application is a continuation of U.S. patent application Ser. No. 14/790,806, filed Jul. 2, 2015, and entitled "PACKET RADIO COMMUNICATIONS SYSTEM," which is a continuation of U.S. patent application Ser. No. 14/049,102, filed Oct. 8, 2013, and entitled "PACKET RADIO COMMUNICATIONS SYSTEM," now abandoned, which is a continuation of U.S. patent application Ser. No. 11/886,985, filed Dec. 16, 2008, and entitled "PACKET RADIO COMMUNICATIONS SYSTEM," now U.S. Pat. No. 8,570,936, which are all hereby incorporated by reference.

FIELD OF THE INVENTION

The present invention relates to packet radio communications systems for communicating internet packets to and/or from mobile user equipment.

BACKGROUND OF THE INVENTION

For the communication of data packets, packet radio communications systems such as the General Packet Radio Service (GPRS) haven been developed. GPRS provides support for a packet-orientated services and is arranged to optimise network and radio resources for packet data communications. For example, GPRS networks can provide a facility for supporting internet protocol services to mobile user equipment. The GPRS provides a logical architecture, which is related to the circuit switched architecture of a mobile radio system.

Internet protocol communications have become prevalent as a means for communicating data efficiently and conveniently. However the growth of internet protocol based services has introduced new demands on networks which operate in accordance with GPRS. It is therefore desirable to enhance packet radio communications systems, like GPRS, to make them more flexible and better able to cope with a rapid growth in internet protocol data traffic and internet protocol based services.

SUMMARY OF INVENTION

According to the present invention there is provided a packet radio communications system for communicating internet packets to and/or from mobile user equipment. The system comprises a core network comprising a plurality of packet data networks, each including network communications elements operable to communicate internet packets using an internet protocol transport plane, and a common gateway support node. The gateway support node is operable to route the internet packets via communications bearers established through the packet data networks using the network communications elements. The system includes a plurality of radio access networks connected by the internet protocol transport plane to the core network components of the packet data networks for communicating the internet protocol packets to and/or from the mobile user equipment. Each of the radio access networks is operable to provide radio. access bearers for communicating the internet packets to and/or from the mobile user equipment. The system includes a packet service control subsystem function comprising an access network part and a non access network part. The access network part is arranged to control the communication of the internet packets via the radio access bearers and the non-access network part is arranged to control the communication of the internet packets via the communications bearers using the network communications elements of the packet data networks. At least one of the plurality of packet data networks is arranged to operate in accordance with a different telecommunications standard than the other packet data networks.

Embodiment of the present invention can provide a packet radio communications system is arranged to support a prevailing use of internet protocol based networks, and an ever changing and increasing use of internet protocol based services and internet protocol networking and transport technologies. To this end, a packet radio communications system according to an embodiment of the present invention can provide a common gateway support node through which communications bearers are established across a plurality of packet data networks via network component elements. The network elements, which form the packet data networks, are formed from standardised GPRS components and non-standardised GPRS and/or evolving packet radio system network components, which may operate in accordance with an evolving 3GPP standard. To unify communication via the different packet data networks and to provide control and policy enforcement from a common gateway support node, a common internet protocol transport plane is utilised for establishing communications sessions via the packet data networks. Furthermore, in some examples, a plurality of different types of radio access network may be provided to facilitate mobile access to internet protocol based communications and services such as Internet Protocol Multi-media Sub-systems (IMS) services from a variety of locations and environments. The packet radio communications system is thereby arranged to cater for rapid growth of internet protocol traffic, by, for example, providing heterogeneous radio access networks for internet protocol based services.

In some examples a common packet communications bearer may be shared by a plurality of mobile user equipment, such as for example where a High Speed Down-link Packets Access service is being provided. For the common communications bearer, a common packet data protocol context may be provided from the gateway support node.

Various further aspects and features of the present inventions are defined in the appended claims.

BRIEF DESCRIPTION OF THE DRAWINGS

Embodiments of the present invention will now be described by way of example only with reference to the accompanying drawings where like parts are provided with corresponding reference numerals and in which:

FIG. 6 is a schematic representation of network components forming part of a core network shown in FIGS. 1 and 2, illustrating a plurality of mobile user equipment establishing packet data protocol contexts, including common packet data protocol contexts, which can communicate using a common packet communications bearer;

FIG. 7 is a schematic representation of parts of the packet radio communications system of FIGS. 1 and 2, providing separate packet communications bearers to two of the mobile user equipment shown in FIG. 6, which share a common packet data protocol context;

FIG. 8 is a schematic representation of parts of the packet radio communications system of FIGS. 1 and 2, providing a common packet data bearers for supporting Internet protocol communications to and/or from two of the mobile user equipment shown in FIG. 6, which share the common packet data protocol context.

DESCRIPTION OF THE PREFERRED EMBODIMENTS

The Basic Network Elements

Figure 1:
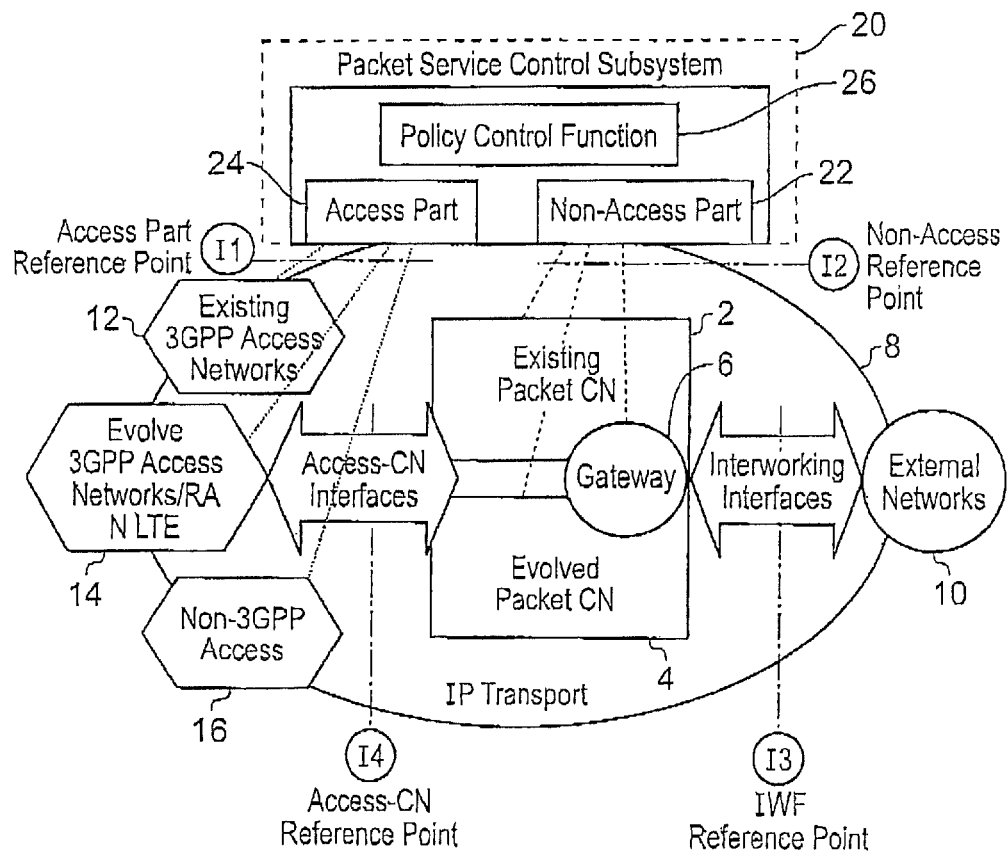
FIG. 1 is a schematic block diagram of a packet radio communications system.

There are four major network elements in the architecture;
The access networks: including the existing 3GPP RAN—UTRAN/GERAN, the evolved 3GPP RAN/LTE, the non-3GPP Access Networks
The Packet Core Networks: including both the existing Packet CN and the evolved Packet CN. The separating of the two in the depiction does not mean separate CN architecture, functions and network elements. The existing packet CN should be re-used at maximum with possible functional extensions and enhancements.
The Packet Service Control Subsystem
External networks FIG. 1 provides an illustration of a system architecture in accordance with an example embodiment of the present invention. In FIG. 1 a core network part comprises core network components according to an existing telecommunications standard such as 3GPP and core network parts 4 which operate in accordance with a non-specified or proprietary standard. The core network components are linked by a gateway support node 6, which is common to the packet data networks which form the core network. The core network components are linked by an internet protocol transport plane 8 via which data is communicated between the network elements. The core network components communicate user and signalling data via fixed line media between external networks 10 and radio access networks 12, 14, 16. The first of the radio access networks 12 operates in accordance with existing 3GPP access network standards and include as will be explained shortly, radio network controllers RNC and node B's to perform a Universal Terrestrial Radio Access Network (UTRAN) interface with the mobile user equipment. In contrast the second radio access network 14 operates in accordance with an evolved 3GPP access network standard such as RANLTE. The third radio access network 16 operates in accordance with a wireless local area network such as IEEE 802.11B otherwise known as WiFi. The control of communication, resource allocation and mobility management is controlled by a packet service control sub-system 20.

The packet service control sub-system 20 is arranged to control the communication of internet packets via the core network between the external network and the mobile user equipment via the radio access network to which the user equipment is attached. The packet service control sub-system 20 comprises an access part 22 and a non-access part 24, which are controlled by a policy control function 26. The Access Part 24 is for controlling the access networks and the Non-access Part 22 is for controlling the core networks and the inter-working functions in the gateway. The Access Part 24 provides the control such as resource allocation and access, the access network selection, QoS, etc. The Non-Access Part 22 provides the control functions with regard to the Application/Service/Session levels in terms of Service/Bearer Access Authorisation, Session Control and Management, QoS (incl. QoS interactions with external networks), Resource access control, Charging, Legal Interception, and interworking with external networks.

The external networks 10 include Internet, Public/Private IP networks, 3GPP/non-3GPP PLMN's, and PSTN, etc.

The Reference Points

There are four reference paints are described in the architecture:
The Access Part Reference Point: including the control functions (access selection, resource allocation/access, QoS, handover/mobility, etc) for access networks I1.
The Non-Access Part Reference Point; including the control functions (service/session/UMTS bearer access authorisation, IP/session Mobility, QoS inter-working, security etc) I2.
The Interworking Reference Point: including the transport functions of user data between the 3GPP PLMN and the external networks I3.
The Access—CN Reference Point: including the transport functions of user data between the access networks and the packet core networks I4.

It is noted that the above baseline architecture does not impose any restrictions with regard the functional split and the corresponding interface definitions between and within the access networks and the packet core networks.

Communication of both user data and signalling data between the respective parts of the system architecture shown in FIG. 1 is shown in accordance with reference points for interfaces which specify the functional interaction between the elements. The first reference point is the access part reference point I1 which specifies exchange of messages and interface between the access part of the policy of the packet service control sub-system and the radio access networks 12, 14, 16. The second access reference point I2 specifies the signalling exchange and interfaces between the non-access part of the packet service control sub-system 20 and the core network components. The third interworking reference point I3 specifies the message and signalling exchange between the gateway support node 6 and the external networks 10. The fourth access core network reference point 14 specifies the signalling messages and interface exchange between the radio access networks 12, 14, 16 and the core network components 4.

Figure 2:
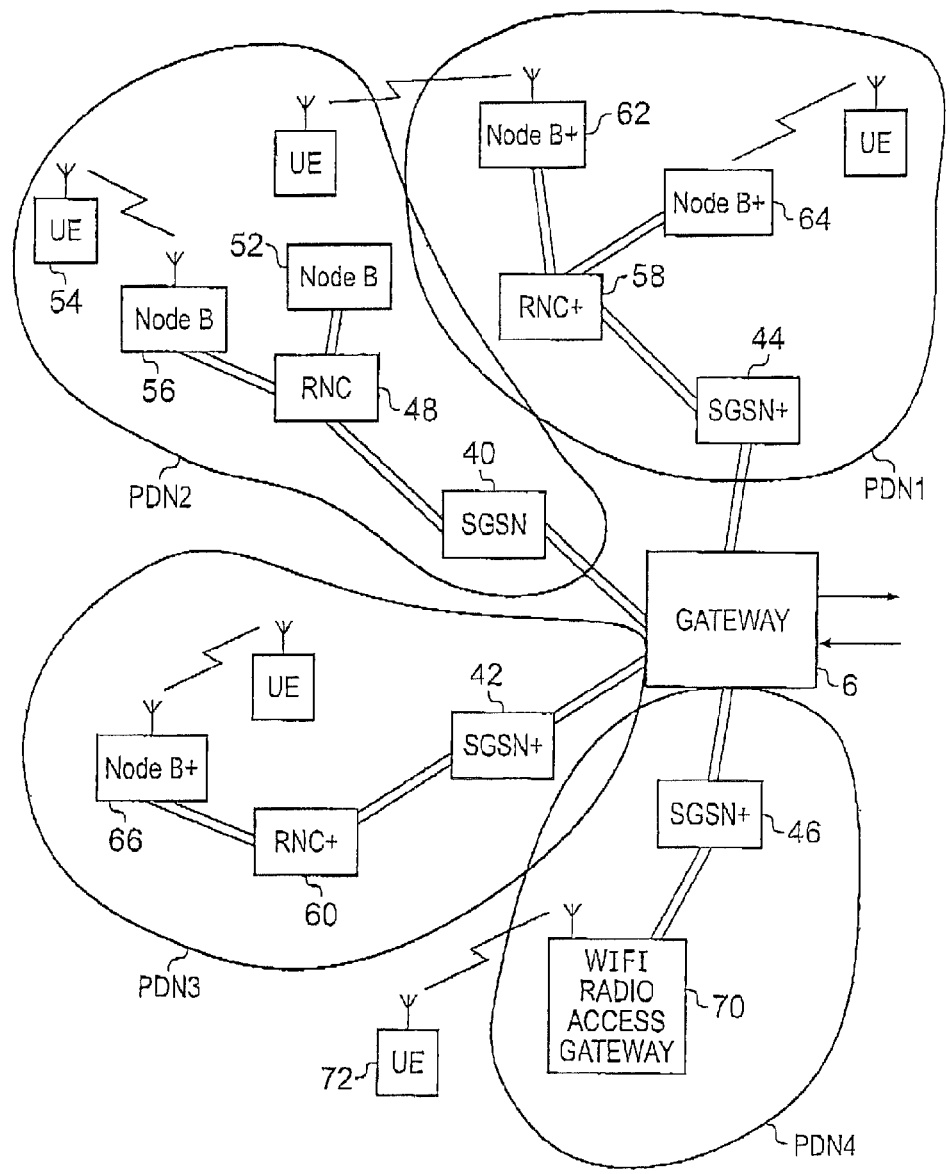
FIG. 2 is a schematic block diagram illustrating in more detail parts of the packet radio communications system shown in FIG. 1.

An example of the core network and radio access network components of the system architecture shown in FIG. 1 is provided in FIG. 2. In FIG. 2 the gateway support node 6 is connected to a serving GPRS support node (SGSN) 40 as well as evolved serving GPRS support nodes (SGSN+) 42, 44, 46. The SGSN 40 and the SGSN+ 42, 44, 46 form parts of four different packet data networks PDN1, PDN2, PDN3, PDN4. The evolved serving GPRS support nodes SGSN+ operate in accordance with an evolved 3GPP standard, a proprietary standard or indeed any other operative component which serves to route internet packets via fixed line media components to radio access network components. As shown in FIG. 2 the SGSN 40 of a conventional GPRS network is connected to a radio network controller (RNC) 48 which is provided with two node-B's 50, 52 which provide a UTRAN radio access interface for communicating with a mobile user equipment 54. Two of the non-standard SGSN 42, 44 are connected to non-standard RNC's 58, 60 which are provided with non-standard node-B's 62, 64, 66. The non-standard node-B's 62, 64, 66 provide a radio access interface in accordance with a non-3GPP access standard or an evolved 3GPP access network/RANLTE standard. The non-standard node-B's 62, 64, 66 provide a radio access interface to mobile user equipment in accordance with the evolved standard.

In contrast the remaining SGSN 46 which operates in accordance with a non-3GPP standard is provided with a WiFi access gateway 70 which provides a radio access interface in accordance with IEEE 802.11 to a mobile user equipment 72. The radio access gateway 70 therefore forms part of a non-3GPP access system 16 shown in FIG. 1.

Figure 3:
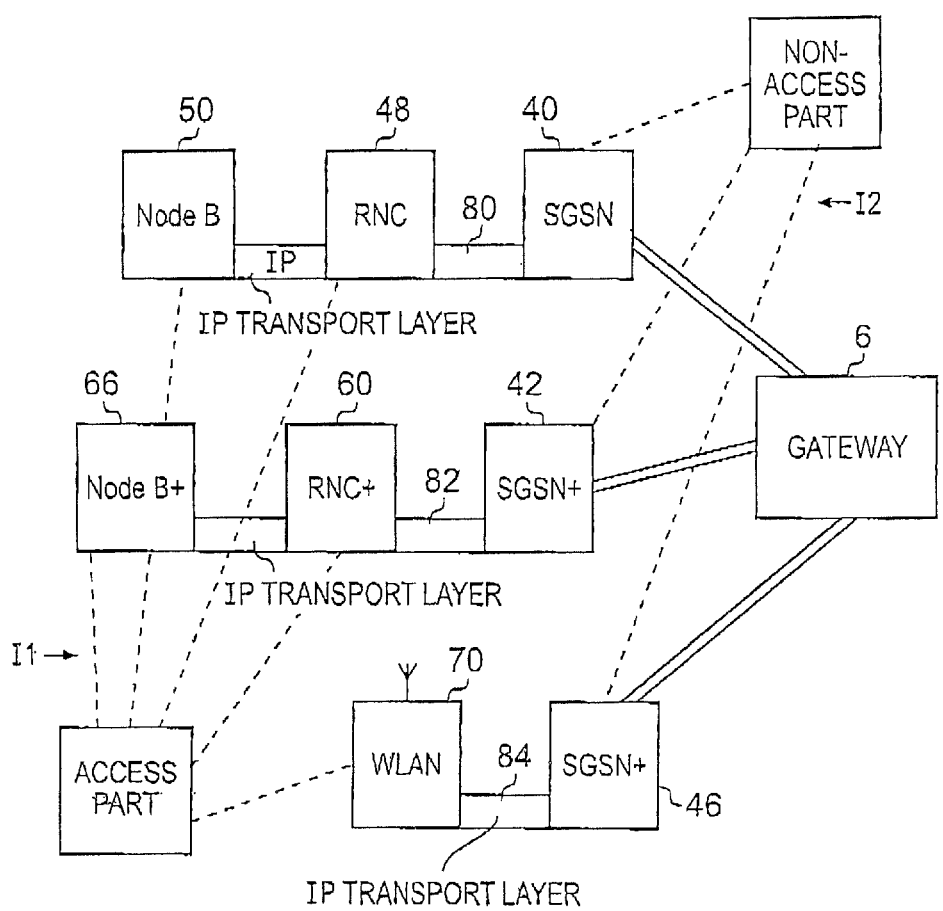
FIG. 3 is a schematic block diagram providing a simplified representation of the parts of the packet radio communications system shown in FIG. 2.

The core network components and the radio access network components shown in FIG. 2 are also shown in FIG. 3 in a simplified representation illustrating the connection of each of the three different networks shown in FIG. 2 to the gateway support node 6. As illustrated in FIG. 3 each of the core network components which is the SGSN 40, the non-standard SGSN+ 42 and the non-standard SGSN+ 46 are connected via a non-access reference point I2 to the non-access part 22 of the packet service control sub-system. Also shown is the access part 24 of the packet service control sub-system 20 which is connected via a reference point I1 to the components of the radio access network. These components are the GPRS standardised radio network controller RNC 48, the Node-B 50 and the evolved 3GPP standardised components which are the RNC+ 60 and the Node-B+ 66 as well as the non-3GPP radio access gateway which is the Wireless LAN 70. As illustrated in FIG. 3 a common unifying aspect of the components of the system architecture is that they are all arranged to operate to communicate internet packets via an internet packet transport layer 80, 82, 84. All of the core network components also connect to the gateway support node 6.

Figure 4:
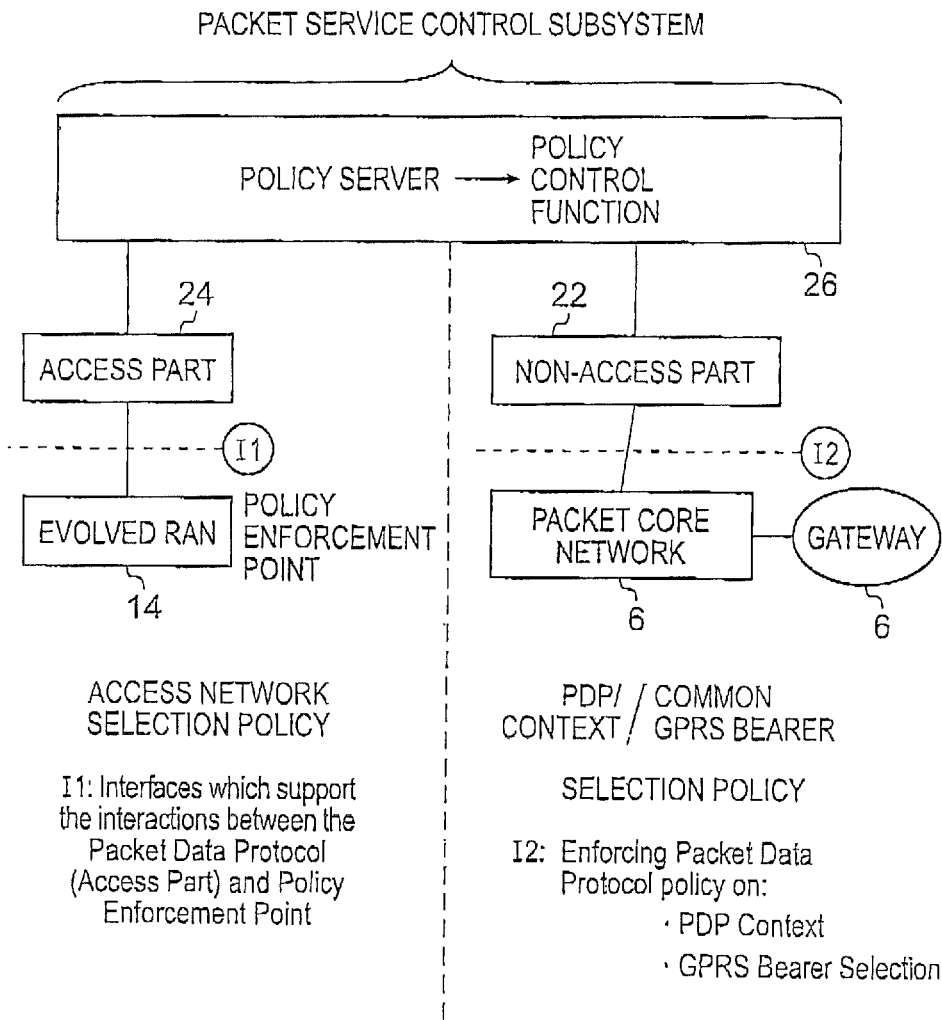
FIG. 4 is a schematic block diagram illustrating the function of a packet service control subsystem, which appears in the packet radio communications system of FIG. 1.

FIG. 4 provides an illustration of the operation of the packet service control sub-system and the reference point interfaces I1 between the access part 24 and an access network such as the evolved radio access network 14 I1. Also shown is the interface between the non-access part 22 and the packet core network 6. The access part 24 operates to control the radio access network and performs a selection policy to select an appropriate one of the access networks. The interface I1 therefore supports interactions between the packet data protocol performed in the access part and a policy enforcement point which is a point in the radio access network for enforcing resource control. Accordingly, signalling functions which are used and specified as part of the reference point are:

Access network selection
Mobility management
Resource allocation and access
Call admission
Load balancing
Quality of service implementation In contrast the non-access part 22 is arranged to control the packet core network 6 to the effect of identifying the appropriate packet data protocol context which should be activated for a particular communications session and the appropriate bearer which should be implemented to provide that communication session. Accordingly the reference point 12 therefore specifies signalling and interaction to enforce packet data policy on the PDP contexts and the packet bearer selection.

Figure 5:
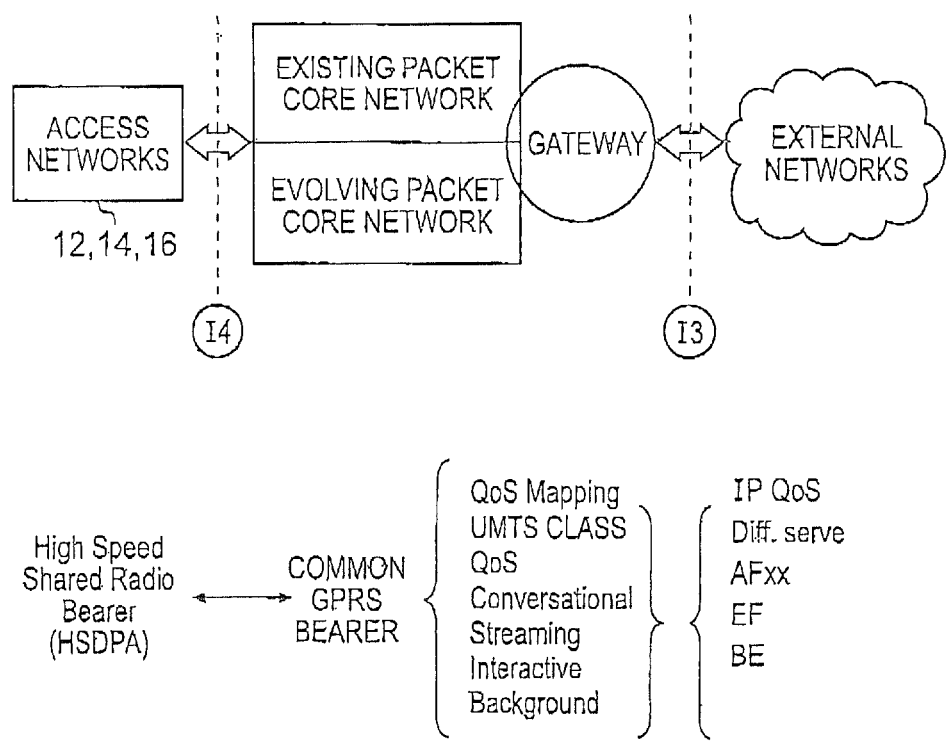
FIG. 5 is a schematic blocks diagram illustrating reference points defining signalling interfaces and inter-action parts of the packet radio communications system shown in FIG. 1.

FIG. 5 provides an illustration of the reference points between the external network and the core network I3 and the access networks and the core network components I4. The interworking reference point I3 specifies an appropriate map between the quality of the service specified in accordance with the internet protocol and a quality of service which is provided on the network such as conversational, streaming, interactive and background. Thus the internet protocol quality of service is specified in the differential service header field identifying, Assured Forwarding (AF) Expedited Forwarding (EF) and Best Effort (BE) are mapped into the corresponding UMTS QRS class. In contrast, the access core network reference point I4 is arranged to specify a mapping between the packet communication bearer established on the core network parts with respect to the radio access bearers provided by the radio access networks 12, 14, 16.

The General Design Principles for the Baseline Architecture

In this section, the architectural role of the access networks, the packet core networks, and the Packet Service Control networks/subsystems are analysed in terms of the above three major functions.

The Design for the Access Networks

The general trend for the evolved access networks are reflected in the following aspects:

Emerging Faster and More Efficient Wireless/Wireline Access Technologies.

New radio and wireline technologies are becoming available to provide more efficient and higher access speed such as xDSL, 802.16e, MIMO, OFDM etc. The evolved access net-works should consider those new emerging access technologies and its integration with existing 3GPP access networks. The design and functional split of radio access protocol stack and procedures should not compromise the efficiency and the performance improvements as brought by those new technologies.

Co-Existing and Complementary Coverage of 3GPP and Non-3-GPP Defined Access Networks To maximise the service accessibility and continuity from 3GPP operators, those non-3GPP defined access technologies and networks should be taken as an important complementary coverage for 3GPP operators' services. Therefore, efficient, flexible, reliable and yet operator controlled interworking, mobility, and roaming with those networks should be supported. A typical example of this complementary coverage is the WLAN Interworking functions as defined in 3GPP. A further enhancement and extension of this concept should be considered for existing and future wireless/wireline access technologies.

Access to be Provided as a Form of Service

In addition to the conventional concept of provisioning the services with regard to the media contents, the access networks may well need to become an important means to provide "transport services" for access to both 3GPP and non-3GPP operators' defined services. This will be under the control of 3GPP operators. One of the direct consequences of this evolved access service is the re-thinking of Bearer Service Access Control and the Charging functions. In addition, this "access service provisioning" should apply to both 3GPP and non-3GPP defined access under the general framework for 3GPP operator controlled access.

Centralised Vs. Distributed Control Over the Radio Access and Radio Resource Management Up to the release 5, the radio access control and radio resource management is centralised within the RNC's in UTRAN. To improve the control and the transport efficiency and accommodate high speed and more spectrum efficient radio access technologies, the functions of RNC versus that of Node-B need to be re-considered. In Release 6, the support of HSPDA/HSUPA already requires some of the key radio resource control functions such as packet scheduling be located within the Node-B. This Node-B based localisation of radio access and resource control is perceived to become one of the important measures to improve the control and transport efficiency and the associated performance, in particular, the reduction of control and transport latencies, in the evolved 3GPP radio access network infrastructure. This will also be beneficial to the elimination of performance bottleneck as caused by the backhaul links and the reduction of both Capex and Opex.

Architectural Split Between Control and Transport Functions

In addition to the perceived benefits of locating the radio access and resource control functions to the very edge of the radio access network such as the Node-B's, the issues of more efficient management of control functions such as radio set-up, configuration/re-configuration, maintenance and release will need to be considered due to their direct impact on the over-all end-user perceived service quality (e.g. call set-up time) and the complexity as well as the associated cost in both deployment and operations (Capex and Opex) of the radio access networks.

Further evolution from the existing joint-locations of the control and transport functions (within both Node B and RNC's) to separate control and transport entities is predicted to be beneficial to the simplification of the radio access network infrastructure and the transport layer functions which, in turn, help improve the control and transport efficiency and performance. In addition, separation of control and transport entities will also facilitate the introduction of new more spectrum efficient radio access technologies, integration and the convergence of fixed and wireless access technologies and the sharing of a common IP transport network between the access networks, packet core network and the packet service control networks.

Maximum Optimisation for IP Traffic

Due to the relatively low efficiency and resource utilisation u in managing and the transporting the IP-based traffic in comparison to that for circuit-switched traffic, the radio access networks will need to be adapted and optimised to support IP traffic, in particular, the real-time IP traffic which features short payloads and relatively large protocol overheads which have adversely affected both the transport efficiency and end-to-end QoS.

The evolved radio access networks should be able to support IP traffic, in particular, the real-time IP traffic with efficiency and quality comparable to that for the circuit-switched traffic. Two of the typical measures, for instance, are the more efficient and robust header compressions and the support of AMR/Unequal error Protections for real-time IP traffic.

The Design for the Packet Core Networks

The evolution of 3GPP Packet Core networks should consider the following issues.

More Efficient Control and Transport Functions with Reduced Complexity and Enhanced Scalability The packet core network serves as the "anchor point" for many important functions such as UMTS session management, user subscription, authorisation, authentication, location management, mobility management, charging, interworking between heterogeneous access networks (3GPP and 3GPP access networks, fix and mobile convergence) and external networks (e.g. Internet, 3GPP and non-3GPP PLMN's), etc, The complexity of those operations contributes to difficulties in achieving overall high end-to-end control and transport efficiency and performance and reducing the cost for deploying and the operating the networks. Measures should be taken to further optimise both the control and the transport functions in the evolved packet core network architecture. For instance, the per session based bearer management and QoS management may need further evolve to improve the system scalability and the general system efficiency and performance.

Simplification of Packet Core Network Infrastructure

It is necessary to evaluate the existing 3GPP packet core networks (SGSN/GGSN based) infrastructure and study the need and benefits as well as the impact of reducing the number of intermediary network elements and the number of open interfaces and reference points. This is foreseen to be beneficial to improving the control and transport efficiency and the performance as well as reduction of both Capex and Opex.

Efficient Support of Multi-Access to Heterogeneous Access Technologies

The packet core network serves as the anchor point of interworking, selection, and access and mobility control across heterogeneous access technologies. The packet core network should be able to support the control and management of IP traffic going to and coming from the heterogeneous access networks with 3GPP operators' centric control in terms of access selection, security, mobility, QoS, etc.

Maximum Optimisation for IP Traffic

The packet core network should present as few control and traffic management points as possible for both incoming and out-going IP traffic. Considering the potential complexity of reducing the IP protocol related transmission and processing overheads, the IP performance optimisations functions such as header compression may well be located within the core network to reduce the complexity and the cost in the radio access networks and improve the over-all end-to-end performance.

Minimise IP Protocols Specific Control and Transport—IPv4 vs. IPv6

Many of the existing UMTS control functions are IPv4 and IPv6 specific. For instance, the UMTS session management (PDP Contexts and TFT operations) are dependent on which version of IP protocol is used. The UMTS CN bearers, as a result, can only carry IPv4 or IPv6 traffic even though the UMTS CN bearers are subsequently encapsulated within the underlying IP transport networks. This will restrict the flexibility of IP-based service access and increases the complexity of the control and management functions and the compromise the scalability.

Efficient Support of IPv4 and IPv6 Transitions

The gradual introduction of IPv6-based services, even IPv6 network elements, into 3GPP PLMN's, is inevitable. While most, if not all, of current 3GPP PLMN's operates based on IPv4. Although the existing 3GPP system Architectures are designed to support both IPv4 and IPv6, there is lack of analysis and study in 3GPP on the effective and low-impact (low cost, undisrupted operations/services) transition mechanisms between IPv4 and IPv6 based 3GPP networks and services. Lots of progress has been made in some working groups in IETF which should be used as important references on the subject.

Flexible and Reliable Inter-Operability with Existing 3GPP Systems

The evolved 3GPP architecture and the improved system functions are expected to provide more efficient support of IP-based services. Careful considerations should be made in making the evolved systems inter-operable with the existing systems and, in the meantime, allows for maximum flexibility as controlled by the operators in directing the IP traffic across the appropriate packet core and access networks based on operators' defined policies.

Interworking with Fixed Networks and Non-3GPP Wireless Networks.

Efficient and reliable inter-working should be supported with fixed networks and non-3GPP defined PLMN's and wireless networks. This inter-working is differentiated from the multi-access support for heterogeneous access technologies as discussed above in that the fixed networks and non-3GPP PLMN's and wireless networks are "external" to the evolved 3GPP system. These interworking functions will be located within the 3GPP PLMN gateway.

The Design for the Packet Service Control Subsystem

The packet service control subsystem provides the control and management of services such as security (authorisation & authentication, user data/information integrity and privacy etc), IP-based session management (e.g. IP Multimedia Session), policy control for QoS, mobility, access selection and resource access control, etc. The packet service control subsystem is operationally independent of both the access networks and the packet core network but may exercise the direct control over the operations within the packet core networks and the access networks.

Effective Control Over the Access and Packet Core Networks

The evolved system architectures for both access networks and the packet core networks are expected to enable the operators to provide effective control based on their policies on network resources allocation and access, QoS, handover and mobility between 3GPP defined networks as well as across 3GPP and non-3GPP defined networks, roaming, service access authorisation in both roaming and non-roaming situations for services provided by both home PLMN's, the visited PLMN's as well as the third party service providers.

The control is also expected to work on an end-to-end basis with other 3GPP and non-3GPP defined networks in terms of security, QoS, service access, etc.

Easy and Flexible Integration with IT-Based Service Creation and Control.

This is to take the advantage of the quick and more effective new service introductions as often seen in IT industries which can implement the defecto (widely accepted and used) standards for IP-based services within a short period of time.

Maximum Re-Use of Existing IP Service Related Protocols and Standards

Due to the many common requirements from both 3GPP operators and ISP's on the control and management of IP-based services, the evolved packet service control subsystem should consider re-using the existing IP protocols as defined in IETF such as SIP with extensions, AAA, IPSec, Policy Framework, QoS Framework/NSIS and IP Mobility Management (Mobile IP) etc, where it is applicable. This will reduce the amount of the work and time and facilitate the integration with non-3GPP specific service control.

Example Illustration of Co-existence of Different PDP Contexts

FIGS. 6, 7, 8 and 9 provide an illustration of the operating of the packet radio communications system shown in FIGS. 1 to 5, operating to establish a common packet data protocol context for establishing and controlling access to a packet data communications bearer. As will be explained, the packet data communications bearer may be a common communications bearer in that is shared by more than one mobile user equipment and/or that different communications session which operate in accordance with different internet protocol versions use the bearer.

FIG. 6 provides an example illustration of an arrangement in which a plurality of UEs have established PDP contexts using the network components of the communications system shown in FIGS. 1, 2 and 3. Two of UEs have established a common PDP context. As shown in FIG. 6, three UEs UEa, UEb, UEc are communicating internet protocol packets across the GPRS network. Two of the mobile user equipment UEa, UEb have established a common GPRS bearer 90. For example the first mobile user equipment UEa may establish the common GPRS bearer by performing a PDP context activation request specifying that the PDP context should be a common PDP context as described above. The gateway support node 6 then establishes a common PDP context 100 for the first UE UEa. The first UE UEa then establishes in combination with the gateway support node 6 a traffic flow template TFTa which includes in the parameter list a common PDP address type. For the example shown in FIG. 6 the first mobile user equipment UEa specifies that the internet protocol address which it will use for its communication session is an IPv4 address. Thus the common PDP address type specified by the TFTa is an IPv4 address as illustrated for the TFTa 102 for the parameter list 104.

The second UE UEb also sets up a common PDP context with the gateway support node 6. Since the common PDP context 100 has already been established by the first UE UEa, then the gateway support node 6 is arranged to join the second UE UEb to the common PDP context. However, a separate common PDP context 100 is associated with a TFT for the second UE which is a TFTb. TFTb also specifies that the packet filter component is a common PDP address type and for the second UE an IPv6 address is specified as the filter component in a field 108. Thus, each mobile user equipment UEa, UEb, UEc, establishes its own TFT. In contrast, the third UE UEc request a conventional primary PDP context activation for its own dedicated GPRS bearer 112. The third mobile user equipment UEc may establish a secondary PDP context 112 which is also arranged to communicate IP packets via a GPRS bearer although only one 112 is shown in FIG. 6. For the third UE UEc a TFTc 114 is established in order to filter packets to either the primary or the secondary PDP context in accordance with a conventional arrangement. Thus as illustrated in FIG. 6 two of the mobile user equipment UEa, UEb are communicating via a common GPRS bearer 90 using a common PDP context 100 although each has its own traffic flow template TFTa, TFTb. In an alternative arrangement the first and second UEs UEa, UEb may establish separate GPRS bearers 90, 114 and communicate internet packets via these separate bearers even though they share a common PDP context.

Common GPRS Bearer

There are two possible scenarios for the first and second mobile user equipment UEa, UEb of the example represented in FIG. 6 to communicate via the GPRS network 1 using the shared common PDP context. One example is shown in FIG. 7. In FIG. 7 the gateway support node 6 establishes a separate GPRS Tunnelling Protocol (GTP) bearer GTP_UA, GTP_UB for each of the first and second UEs UEa, UEb. As shown in FIG. 7 although the first and second UEs share a common PDP context, the internet protocol packets are communicated across the GPRS network via separate GTP bearers. When the internet protocol packets reach the RNC 60 for communication via a Radio Access Bearer (RAB) the separate GTP GTP_UA, GTP_UB are mapped onto corresponding radio access bearers RABa, RABb. Accordingly, each of the radio access bearers and the GTP established for each of the first and second UEs UEa, UEb can specify a different quality of service QoSa, QoSb. Thus, there is a one to one mapping between the radio access bearer and the GTP. FIG. 7 is therefore an example of a common PDP context but using different GPRS bearers.

An alternative arrangement is shown in FIG. 8 in which the first and second UEs UEa, UEb which have established a common PDP context utilise a common GPRS bearer. As such there is no distinction of the GTP established by the gateway support node 6. That is to say the GPRS bearer is shared between the first and second UEs UEa, UEb. In order to correctly communicate internet packets across the GPRS network via the radio access interface established by the RNC, the RNC must identify internet protocol packets, which are destined for either the first UB UEa or the second UE UEb. To this end, the RNC is provided with a radio access bearer filter 200. The radio access bearer filter 200 receives the internet packets from the GTP_U and identifies an appropriate one of two radio access bearers RABa, RABb from which and to which the first and second UEs UEa, UEb communicate internet packets respectively. In order to filter the internet packets correctly onto the appropriate radio access bearers RABa, RABb, the RAB filter 200 is provided with a destination address of the first and second UEs UEa, UEb. Thus, as illustrated in FIG. 8, the RAB filter 200 identifies the destination address in the header of the internet protocol packet 202 received in the GTP units 204. In accordance with the destination address for the first or the second UEs UEa, UEb, the RAB filter filters the internet protocol packets to the appropriate bearer for delivery to the corresponding UE UEa, UEb.

Providing Different Quality of Service on a Common GPRS Bearer

Figure 9:
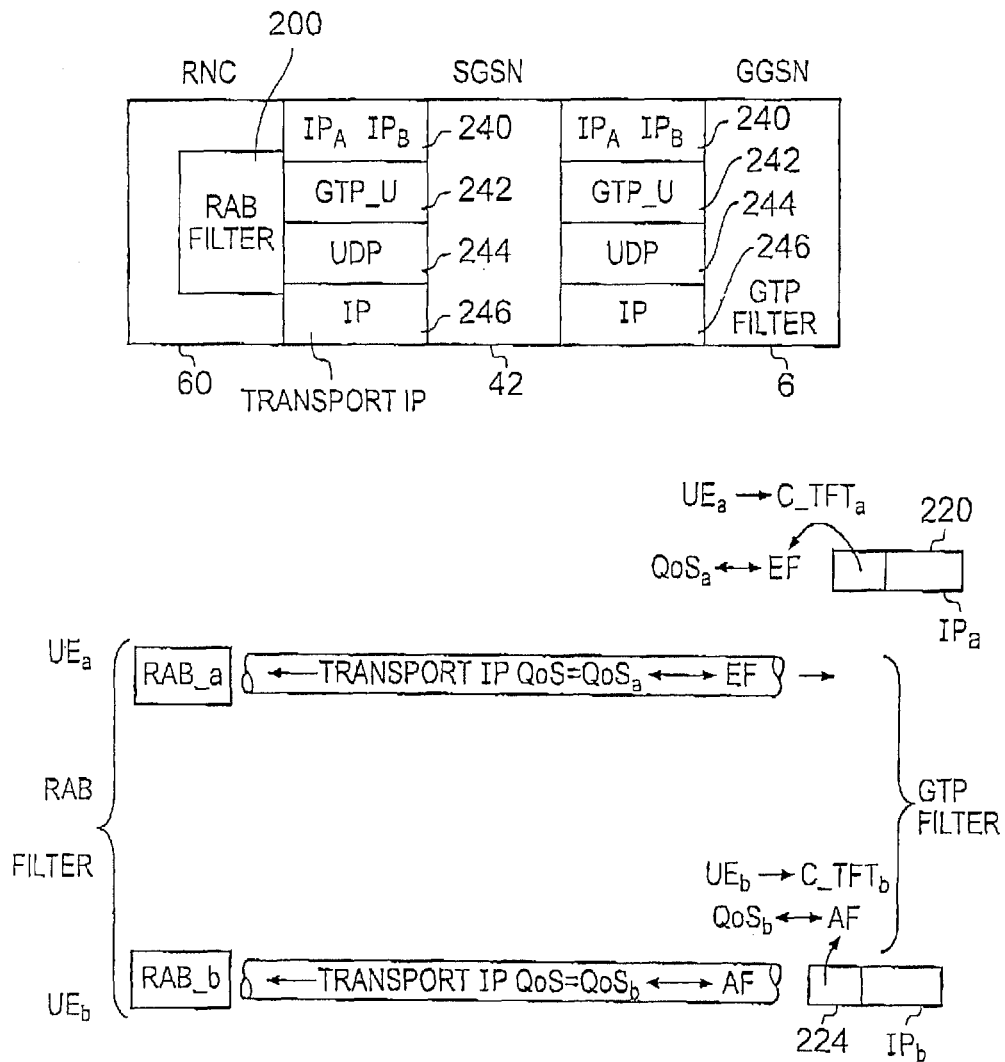
FIG. 9 is a schematic representation of parts of the packet radio communications system of FIG. 8, illustrating the operation of the radio network controller to communicate internet packets to the two mobile user equipment which share a common packet data protocol context and a common packet data protocol bearer, using a radio access bearer filter.

FIG. 9 provides an illustrative representation of an arrangement by which different quality of service can be provided to the communication of internet packets via a common GPRS bearer. For example, one communications session may be communicating internet packets in accordance with Web browse, whereas another communications session may be communicating internet packets in accordance with voice over internet protocol. In accordance with the present technique differing quality of services are achieved by mapping a differential service quality of service (QoS) class provided within the IETF internet protocol standard onto an appropriate quality of service for communication across the GPRS core network. As those acquainted with the internet protocol standards v6 and v4 will appreciate, the differential service QoS provided within the IETF standard has three categories which are Expedited Forwarding (EF) Assured Forwarding (AF) and Best Effort (BE). As shown in FIG. 9 internet packets IPa, IPb which are being communicated to either the first or the second UEs UEa, UEb 220, 224 are received at the gateway support node 6. In each of the respective headers of the internet packets IPa, IPb, 220, 224 is provided a differential service QOS. For the example shown in FIG. 9, the differential service QoS for the first internet packet destined for the first UE IPa 220 is EF whereas the differential service QOS for the second internet packet destined for the second UE IPb 224 is AF. The gateway support node 6 is arranged to form a GTP filter which is operable to map the differential service QoSs EF and AF into an appropriate quality of service QoSa, QoSb for communication across the core network to the RNC. The quality of service provided by the GTP_U QoSa, QoSb may be the same as the EF and AF according to the IETF standards, or maybe an alternative differential in quality of service class. The first and second internet packets IPa, IPb 220, 224 are then communicated via the transport IP layer to the RNC.

As shown in FIG. 9 communication between each of the core network elements gateway support node, SGSN 42 to the RNC 60, is via different protocol levels. These are a higher level end to end internet protocol level 240, a GTP_U internet protocol level 242, a UDP layer 244 and an internet protocol transport layer 246. Thus, the gateway support node 6 is arranged to communicate the internet packets via the transport internet protocol layer using quality of service QoSa, QOSb identified from the differential quality of service AF, EF identified in the headers of each of the packets for communication to the respective first and second UEs UEa, UEb.

When the internet packets are received at the RNC, then the RAB filter 200 operates in a corresponding way to that explained with reference to FIG. 8 to pass the packets from each of the internet protocol transport layers to the appropriate radio access bearer RABa, RABb. The appropriate radio access bearers are identified by the destination address of the first or second user equipment UEa, UEb. In accordance with the present technique the UEs are arranged to establish a RAB filter, when the common PDF context is established. Therefore in an analagous way in which the TFT is established, each UE sets up an appropriate component in the RAB filter, so that the internet packets received from the transport IP layer can be filtered to the appropriate radio access bearer.

Various further aspects and features of the present invention are defined in the appended claims. Various modifications can be made to the embodiments herein described without departing from the scope of the present invention.

The invention claimed is:

1. A packet radio communications system for communicating internet packets to and/or from one or more mobile user equipment, the system comprising
a core network comprising a plurality of packet data networks, each including network communications elements operable to communicate internet packets using an internet protocol transport plane, and a common gateway support node, the gateway support node being operable to route the internet packets to and from the mobile user equipment via one or more packet data communication bearers established through the packet data networks using the network communications elements,
a plurality of radio access networks connected by the internet protocol transport plane to the network communications of the packet data networks for communicating the internet protocol packets to and/or from the mobile user equipment, each of the radio access networks being operable to provide radio access bearers for communicating the internet packets to and/or from the mobile user equipment,
a packet service control subsystem function comprising an access network part and a non-access network part, the access network part being arranged to control a selection of the radio access networks for communicating the internet packets via the radio access bearers and the non-access network part being arranged to control the communication of the internet packets via the communications bearers using the network communications elements of the packet data networks by activating a packet data communication bearer suitable for supporting a communication session corresponding to the communication of the internet packets to and/or from the mobile user equipment, wherein at least one of the plurality of packet data networks is arranged to operate in accordance with a different telecommunications standard than the other packet data networks and wherein the packet service control subsystem function is operable to provide different qualities of service (QoS) implementations in establishing the packet data communication bearers which are then used to forward the internet packets according to the quality of service (QoS) as requested in one or more headers of the internet packets.

2. The packet radio communications system as claimed in claim 1, wherein the common gateway support node is operable to establish common packet communications bearers via the packet data communications networks and the radio access networks, the common packet data communications bearers being arranged to communicate internet packets to and/or from mobile user equipment using a plurality of different internet protocols.

3. The packet radio communications system as claimed in claim 2, wherein the common gateway support node is operable to establish in combination with the network communications elements common packet data protocol context for providing resource allocation control and connection of the internet packets communicated via the common packet data communications bearers.

4. The packet radio communications system as claimed in claim 2, wherein the common packet data communications bearers are shared by more than one mobile user equipment.

5. The packet radio communications system as claimed in claim 1, wherein at least one of the radio access networks is arranged to operate in accordance with a different telecommunications standard than the other radio access networks.

6. A method of communicating internet packets to and/or from one or more mobile user equipment using a packet radio communications system, the system comprising a core network, a plurality of radio access networks and a packet service control subsystem function, the core network comprising a plurality of packet data networks, each including network communications elements for communicating internet packets using an internet protocol transport plane, and a common gateway support node, the plurality of radio access networks being connected by the internet protocol transport plane to the packet data networks, the method comprising:
establishing communications bearers through the transport plane of the packet data networks using the network communications elements,
routing the internet packets via at least one of the established communications bearers,
providing radio access bearers using the plurality of radio access networks connected by the internet protocol transport plane to the network communication elements the packet data networks,
communicating the internet packets to and/or from the mobile user equipment via the radio access bearers,
controlling a selection of the radio access networks for communicating the internet packets via the radio access bearers using the access network part of the packet service control subsystem function, and
controlling the communication of the internet packets via the communications bearers using the non-access network part of the packet service control subsystem function by activating a packet data communication bearer suitable for supporting a communication session corresponding to the communication of the internet packets to and/or from the mobile user equipment, wherein at least one of the plurality of packet data networks is arranged to operate in accordance with a different telecommunications standard than the other packet data networks and the communication session is controllable to provide different qualities of service (QoS) implementations in establishing the packet data communication bearers which are then used to forward the internet packets according to the quality of service (QoS) as requested in one or more headers of the internet packets.

7. An apparatus for communicating internet packets to and/or from one or more mobile user equipment using a packet radio communications system, the system comprising a core network, a plurality of radio access networks and a packet service control subsystem function, the core network comprising a plurality of packet data networks, each including network communications elements for communicating internet packets using an internet protocol transport plane, and a common gateway support node, the plurality of radio access networks being connected by the internet protocol transport plane to the packet data networks, the system further comprising:
means for establishing packet data communications bearers through the transport plane of the packet data networks using the network communications elements,
means for routing the internet packets via at least one of the established packet data communications bearers,
means for providing radio access bearers using the plurality of radio access networks connected by the internet protocol transport plane to the core network components of the packet data networks,
means for communicating the internet packets to and/or from the mobile user equipment via the radio access bearers,
the apparatus comprising:
means for controlling a selection of the radio access networks for communicating the internet packets via the radio access bearers using the access network part of the packet service control subsystem function, and
means for controlling the communication of the internet packets via the packet data communications bearers using the non-access network part of the packet service control subsystem function by activating a packet data communication bearer suitable for supporting a communication session corresponding to the communication of the internet packets to and/or from the mobile user equipment,
wherein at least one of the plurality of packet data networks is arranged to operate in accordance with a different telecommunications standard than the other packet data networks.

8. A mobile user equipment for communicating internet packets via a packet radio communications system, the mobile user equipment configured to receive and transmit the internet packets via a core network comprising a plurality of packet data networks, each including network communications elements operable to communicate the internet packets using an internet protocol transport plane, and a common gateway support node, the gateway support node being operable to route the internet packets to and from the mobile user equipment via one or more packet data communication bearers established through the packet data networks using the network communications elements; and via a plurality of radio access networks connected by the internet protocol transport plane to the network communications elements of the packet data networks for communicating the internet protocol packets to and/or from the mobile user equipment, each of the radio access networks being operable to provide radio access bearers for communicating the internet packets to and/or from the mobile user equipment;

wherein the packet radio communications system includes a packet service control subsystem function comprising an access network part and a non-access network part, the access network part being arranged to control a selection of the radio access networks for communicating the internet packets via the radio access bearers and the non-access network part being arranged to control the communication of the internet packets via the communications bearers using the network communications elements of the packet data networks by activating a packet data communication bearer suitable for supporting a communication session corresponding to the communication of the internet packets to and/or from the mobile user equipment, wherein at least one of the plurality of packet data networks is arranged to operate in accordance with a different telecommunications standard than the other packet data networks and wherein the packet service control subsystem function is operable to provide different qualities of service (QoS) implementations in establishing the packet data communication bearers which are then used to forward the internet packets according to the quality of service (QoS) as requested in one or more headers of the internet packets.

9. A mobile user equipment for communicating internet packets to and/or from other mobile user equipment using an apparatus within a packet radio communications system, the system comprising a core network, a plurality of radio access networks and a packet service control subsystem function, the core network comprising a plurality of packet data networks, each including network communications elements for communicating internet packets using an internet protocol transport plane, and a common gateway support node, the plurality of radio access networks being connected by the internet protocol transport plane to the packet data networks, the system further comprising:

means for establishing packet data communications bearers through the transport plane of the packet data networks using the network communications elements, means for routing the internet packets via at least one of the established packet data communications bearers, means for providing radio access bearers using the plurality of radio access networks connected by the internet protocol transport plane to the core network components of the packet data networks, means for communicating the internet packets to and/or from the mobile user equipment via the radio access bearers, the apparatus comprising:

means for controlling a selection of the radio access networks for communicating the internet packets via the radio access bearers using the access network part of the packet service control subsystem function, and means for controlling the communication of the internet packets via the packet data communications bearers using the non-access network part of the packet service control subsystem function by activating a packet data communication bearer suitable for supporting a communication session corresponding to the communication of the internet packets to and/or from the mobile user equipment, wherein at least one of the plurality of packet data networks is arranged to operate in accordance with a different telecommunications standard than the other packet data networks.

* * * * *